United States Patent [19]

Jung-Kwang

[11] Patent Number: 4,674,466
[45] Date of Patent: Jun. 23, 1987

[54] FUEL PULVERIZER OF GASOLINE ENGINE

[76] Inventor: An Jung-Kwang, C.P.O. Box 5651, Seoul, Rep. of Korea

[21] Appl. No.: 756,229

[22] Filed: Jul. 18, 1985

[51] Int. Cl.⁴ .............................................. F02M 29/04
[52] U.S. Cl. ..................................... 123/590; 123/557
[58] Field of Search ................................ 123/590, 557

[56] References Cited

U.S. PATENT DOCUMENTS

| | | | |
|---|---|---|---|
| 1,973,162 | 9/1934 | Briggs | 123/590 |
| 2,430,841 | 11/1947 | Wulfhorst | 123/590 |
| 2,453,595 | 11/1948 | Rosenthal | 123/590 |
| 2,791,994 | 5/1957 | Grieb | 123/590 |
| 3,618,577 | 11/1971 | Shaw et al. | 123/590 |
| 4,187,819 | 2/1980 | Longobardi | 123/590 |
| 4,190,032 | 2/1980 | Wright | 123/590 |
| 4,213,432 | 7/1980 | Levy | 123/590 |
| 4,351,305 | 9/1982 | Isogai et al. | 123/590 |
| 4,452,219 | 6/1984 | Tay-Lodge et al. | 123/590 |

FOREIGN PATENT DOCUMENTS

| | | | |
|---|---|---|---|
| 493912 | 5/1954 | Italy | 123/590 |
| 110763 | 7/1982 | Japan | 123/590 |
| 1982450 | 6/1982 | Rep. of Korea . | |
| 19851306 | 6/1985 | Rep. of Korea . | |
| 19851307 | 6/1985 | Rep. of Korea . | |

*Primary Examiner*—E. Rollins Cross
*Attorney, Agent, or Firm*—Lowe, Price, LeBlanc, Becker & Shur

[57] ABSTRACT

An intake system of an internal combustion engine micronizes the fuel particles of a mixture gas by providing a swirl pot (4) for the carburetor (2), the swirl pot located between the intake manifold (1) and the carburetor (2). The structure is related to a fuel pulverizer of a gasoline engine which provides the increased combustion efficiency of a gasoline engine. The fuel microvaporizer of the present invention is formed with a swirl pot (4) which is shaped with a concave spoon-like form, and is installed between the connecting flanges (3) of the intake manifold (1) and carburetor (2), and includes an intake gas pipe (5) at the center of the concave swirl pot and properly distanced therefrom.

14 Claims, 15 Drawing Figures

Fig. 4 Schematic diagram of experimental apparatus

Fig. 5 Test mode cycle

Fig. 6 Brake specific fuel consumption according to engine speed at full throttle.

Fig. 7 Brake horse power according to engine speed at full throttle.

Fig. 8 Brake specific fuel consumption according to engine speed at full throttle.

Fig. 9 Brake horse power according to engine speed at full throttle.

Fig. 10 Pressure difference between intake ports based on #1 cylinder.

FUEL PULVERIZER OF GASOLINE ENGINE

TECHNICAL FIELD OF THE INVENTION

Intake system of internal combustion engine influences greatly to the capacity of engine through the volumetric efficiency, and also uniform distribution of fresh air has been examined prudently.

The fuel sucked into a gasoline engine is spouted out of a main nozzle and sprayed by the air pressure as fuel particles. Since the range of maximum combustion efficiency of fuel particles is narrow, and where perfect combustion has not been achieved according to a change of engine speed, not only has the fuel been the cause of sooty smoke but also fo excessive fuel consumption.

PRIOR ART OF THE INVENTION

To improve the above described disadvantage, as in the Korea Utility Model publication No. 1982-450, Utility Model application No. 1983-5614 and 4328, some devices have been developed to pulverize the gas mixture further more by installing a swirl pot with a heater between the carburetor and intake manifold.

However, it has been the case that users avoid use of the device because it could not be controlled to obtain maximum efficiency of the intake system, and the temperature of the gas mixture which passes through the heater could not keep a constant temperature according to the flow speed, and despite the rather complicated structure of the devices, the efficiency thereof is comparatively low.

For instance, since the air and fuel valve was set based on the engine heat at maximum engine speed, when the engine speed is changed to a low speed, heater temperature will be changed accordingly, but the mixture gas at low engine speed will pass through the heater with a mixture ratio of the air and fuel valve as originally set, and therefore, it has been the cause of decreasing the combustion efficiency.

An essential defect is that it gives considerable overload to an engine on long time operation. That is to say, the cooling effect of the engine will be decreased by taking the heat back again to an intake pipe from engine heat.

As described above, because the usual pulverizer pulverizes the mixture gas spouted out of carburetor with heating, for the purposed, electric heater which electric power is supplied by another power line separately, or exhausting heat taken from engine are applied, and therefore not only is the structure of the device complicated but also it has a high failure rate.

OBJECT OF THE INVENTION

An object of the present invention is to improve the fuel pulverizer of gasoline by eliminating the above described several defects.

The present invention increased highly the combustion efficiency of a gasoline engine by installing thereon a swirl pot and an air intake pipe having the mixture gas sucked in through a throttle valve stagnate for a while on the swirl pot, mixing the mixture gas once again with secondary fresh air flow from the outside atmosphere, and pulverizing further the mixture gas flow, increasing the mixture rate of oxygen in the mixture gas, and by decreasing the pressure difference of mixture gas which sucked into each intake manifold.

BRIEF DESCRIPTION OF THE DRAWINGS

FIG. 2-1 shows A.B.C and D types of swirl pots.

DETAILED DESCRIPTION OF THE INVENTION

Figures 1, 2:
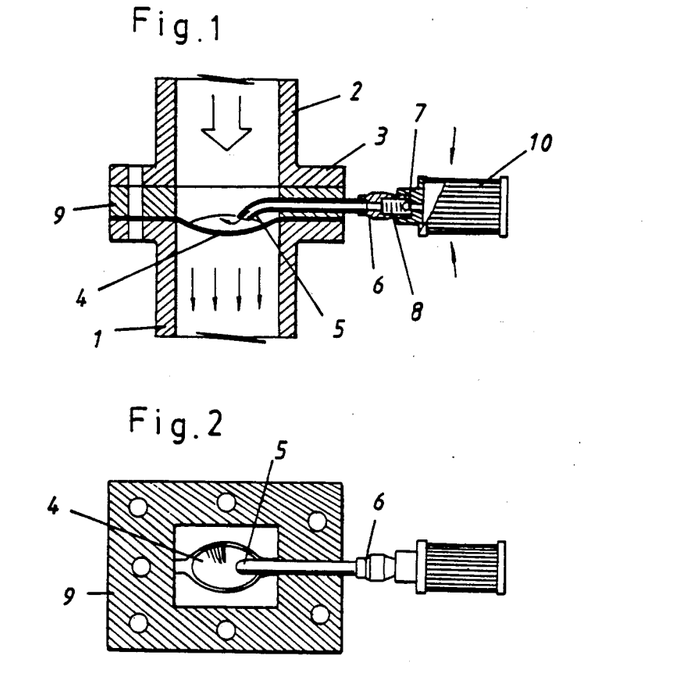
FIG. 1 shows longitudinally a sectional view of the present invention.
FIG. 2 shows a plan sectional view of FIG. 1.
Figure 3:
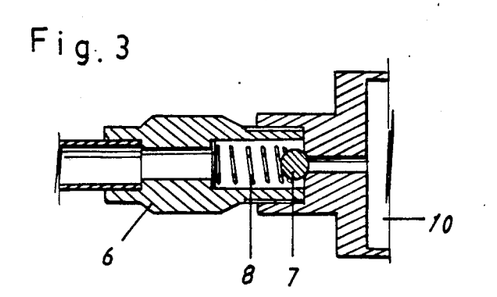
FIG. 3 shows a detailed sectional view of a valve of an intake pipe.

As in the FIGS. 1 to 3, a swirl pot (4) is installed between connecting flanges (3) of an intake manifold (1) and a carburetor (2), an intake gas pipe (5) is pointed downwardly on the center of the swirl pot maintaining a proper distance, another end (6) of the intake gas pipe is extended externally of the carburetor, and a steel ball (7) is pressed with coil spring (8) outwardly to shut the valve opening inside of the another end (6) of intake gas pipe (5). Reference number 10 is an air filter.

As described above, the way of fixing an intake gas pipe (5) is proper to bury the intake gas pipe (5) into the supporting board (9) which is made of some metal plate of appropriate thickness, and inserted between each of the flanges (3) of intake manifold (1) and carburetor (2).

The swirl pot may have a concave form, such as the shape of a spoon, according to the test result.

The function and effect of a device according to the present invention is explained as follows.

As a swirl pot (4) is fixed between intake manifold (1) and carburetor (2), mixture gas from the intake manifold is accelerated to flow by the suction force from the intake manifold. While flowing the mixture is forced to collide against the swirl pot. At this time a swirl phenomenon occurs for the mixture gas on the swirl pot by the suction force of cylinder through intake manifold.

A swirl pot is preferably made of copper which has excellent thermal conductivity, and is fixed at or near the inlet of the intake manifold, and therefore, can keep hot condition affected from engine heat through intake manifold, and every particle of mixture gas collided against swirl pot is vaporized simultaneously, so that the effect of micronizing the fuel particle is obtained.

On the other hand, another end of the intake gas pipe fixed on the swirl pot is extended to the outside of the carburetor, and thus the air from the outside atmosphere is sucked in through the gas pipe (5) according to the suction force of the engine cylinders through the intake manifold.

Another end of the intake gas pipe is formed for accommodating the ball valve with which a coil spring presses the ball, and the valve opening is controlled automatically according to the flowing velocity of mixture gas which is sucked into the intake manifold so that the quantity of air flow into the carburetor is controlled automatically.

And therefore, flow velocity of mixture gas passed through throttle valve and sucked into the intake manifold, is changed proportionally according to the opening ratio of the throttle valve. For instance, when the engine operates at its lowest speed with an almost closed condition of throttle valve, not only is the flow velocity of mixture gas made lower but also the quantity of mixture gas is made smaller, and the swirl phenomenon occurs proportionally less according to the mixture gas colliding less to swirl pot. Thus, the suction force and the amount of air quantity sucked through the intake gas pipe is sucked smaller proportionally.

On the contrary, when the throttle valve is opened fully, not only is the quantity of mixture gas made larger but also the flow velocity is made faster.

And therefore, not only is the quantity of mixture gas colliding to the swirl pot made larger but also the suction force and collision force is increased and fuel particle is pulverized and vaporized to be smaller and the quantity of air suction is made larger too.

Finally, the pulverizer according to the present invention has advantages from which it is able to expect the maximum combustion efficiency of gasoline engine by micronizing the vaporized fuel particle and by supplying said mixture gas proportionally according to the adjustment of engine speed.

Following experimental apparatus were applied to prove the operation and effect of the pulverizer according to the present invention.

1. Engine power meter (analogue type)
   Type—Water cooling electric over current brake type.
   Maximum absorption horse power (PS)—100
   No. of max. absorption revolution (rpm)—7000
2. Engine speed meter (digital type for gasoline
   Suitability detector—IP-295 Ignition detector
   Range of test—400-9999 rpm
   No. of ind. places—4 places+1 overflow
   Indicator—large LED indicator
   Testing time—0.5 sec. 7 segmant
   Accuracy—±1 rpm
3. Flow meter (for use with measurement of quantity of fuel consumption)

(A) detecting part

Range of test—0.3–120 l/h
   Accuracy—±0.0035 l/h down
   Pressure loss—300 mm $H_2$/60 l/h
   No. of pluse detected/volume—120/10.8 ml
   Presure proof limit—body-70 kg/cm$^2$, filter-100 kg/cm$^2$, pressure sensor-3 kg/cm$^2$
   Filter—5 microns
   Appling temperature—0°–+65° C.
   Weight—approx. 5 kg (B) indicating part Displaying type—LED
   Momentary flow quantity—0–999.9 l/h
   Aggregated time—0–9999 sec. or 0–999.9 sec.
   Aggregated flow quan.—it is able at any scale
   Electric voltage output—0–10 v/0–100 l/h, Impedance 10 K ohms up
   Pulse output—0.1 ml/1P 5TTL
   Applying temperature—0°–45° C.
   Electric power input—AC 100 V or DC 12 V
4. Applied engine for experiment
   Form—4 cycle, 4 cylinder, series
   Size of cylinder (mm)—73×86-4
   Total displacement (cc)—1439
   Compression ratio—9.0
   Max. output (ps/rpm)—92/6,300
   Max. torque (kg-m/rpm)—12.5/4,000
   Type of valve—OHC
   Cooling method—Water cooling The following describes testing methods taken to provide the operation and effect of the device according to the present invention.

(1) Test corresponding to the linear change of engine speed.

Figure 4:
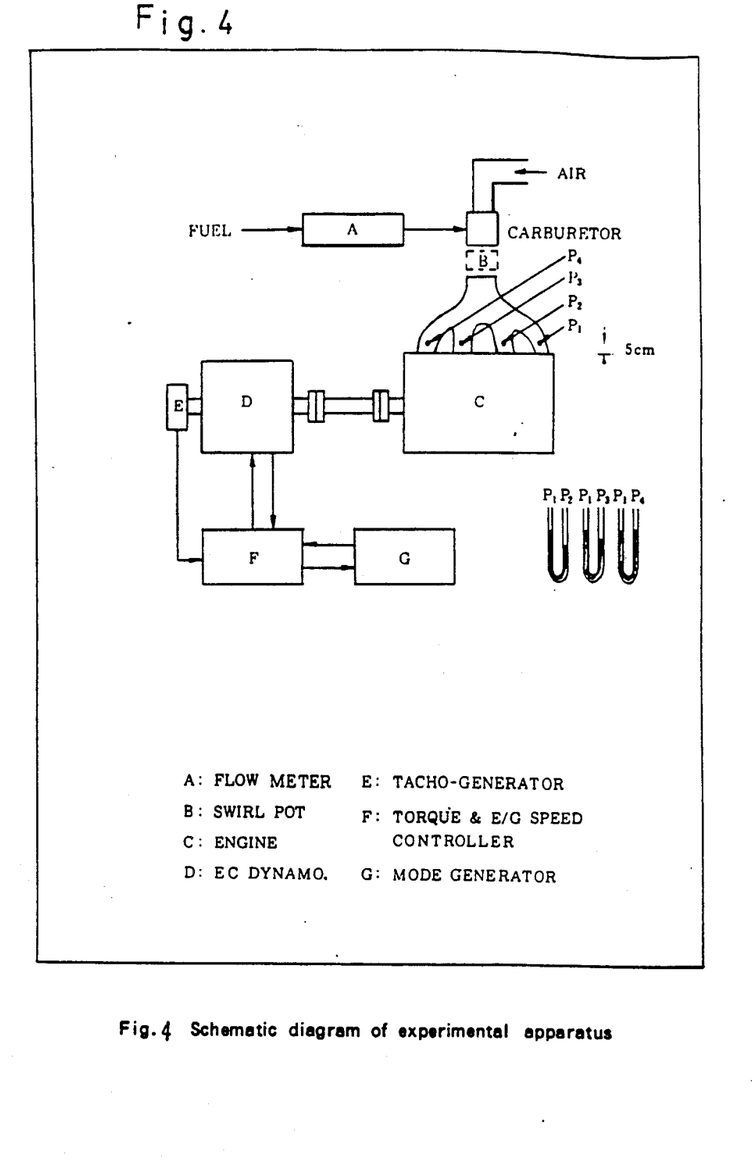
FIGS. 4 to 10 are charts of test results and testing method regarding the fundamental embodiment and the comparatives of the present invention.

FIG. 4 shows the schematic diagram of experimental apparatus. Fuel consumption is measured according to linear change of the engine speed from 1,200 rpm to 3,400 rpm at 100% of throttle opening and controlling the load of engine power meter. After warm up the engine sufficiently at first, basic data without the swirl pot is measured, and the various swirl pots are set in the intake manifold alternatively, and then the same test is repeated. And, to conform the distribution of mixture gas to each individual intake port, a difference of static pressure is measured by a manometer between individual intake port of No. 1 cylinder and each separate individual intake port of another number of engine cylinder as in FIG. 1.

(2) Test corresponding to test mode cycle with changing of the engine speed.

Figure 5:
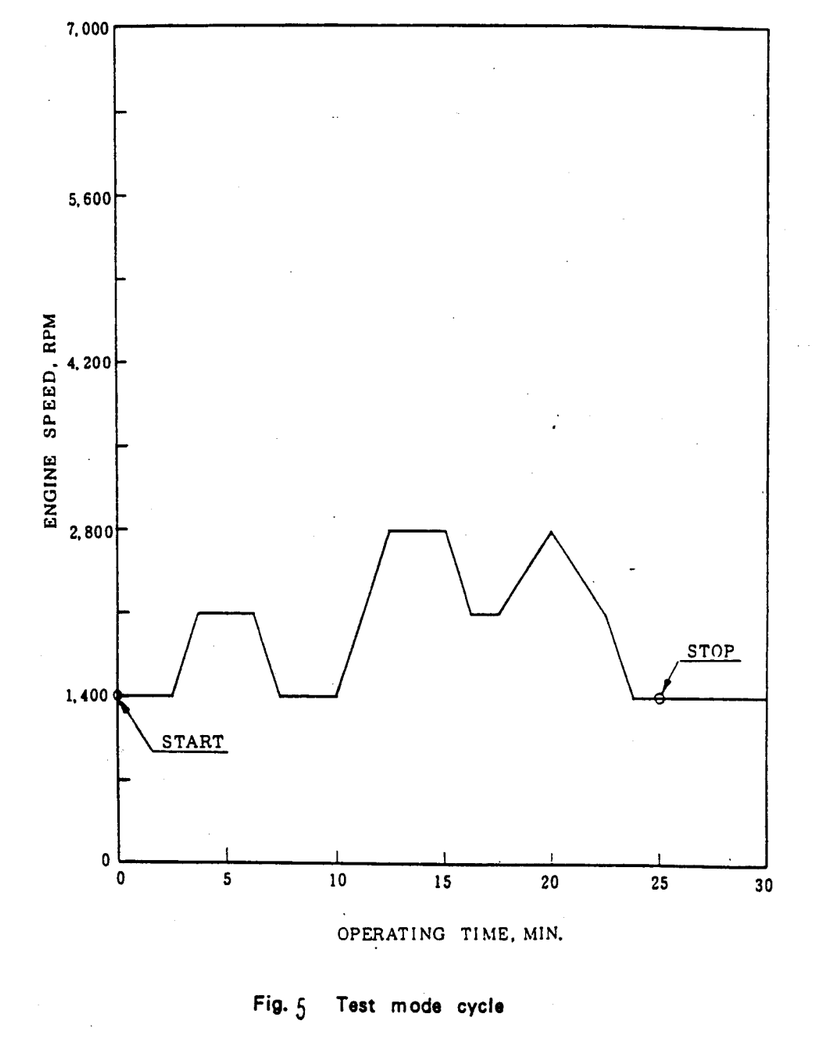

Test mode as in FIG. 5 is applied to measure the fuel consumption under the condition of increasing or decreasing of engine speed is combinated irregularly. Average fuel consumption per one cycle of test mode, and basis data is established with two times of measurement at full throttle opening with operation of automatic engine speed controller and mode generator simultaneously. A similar test is repeated with the swirl pot installed.

The results under the above described testing method are explained according to FIGS. 6–10 as follows.

Figure 6:
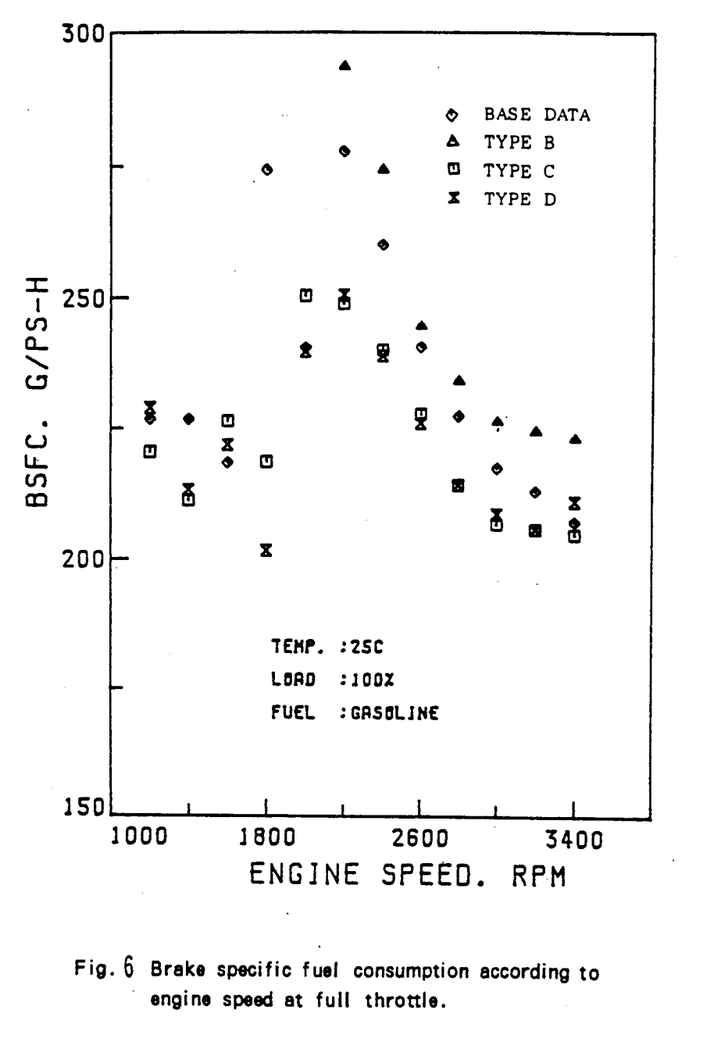

FIG. 6 illustrates the brake specific fuel consumption according to engine speed at full throttle opening tested with B, C and D type swirl pot which is similar to the present invention. In case of C and D type swirl pot, brake fuel consumption is decreased generally from basic data, but in case of B(△) type of swirl pot, brake fuel consumption is rather higher than basic type (◇).

Figure 7:
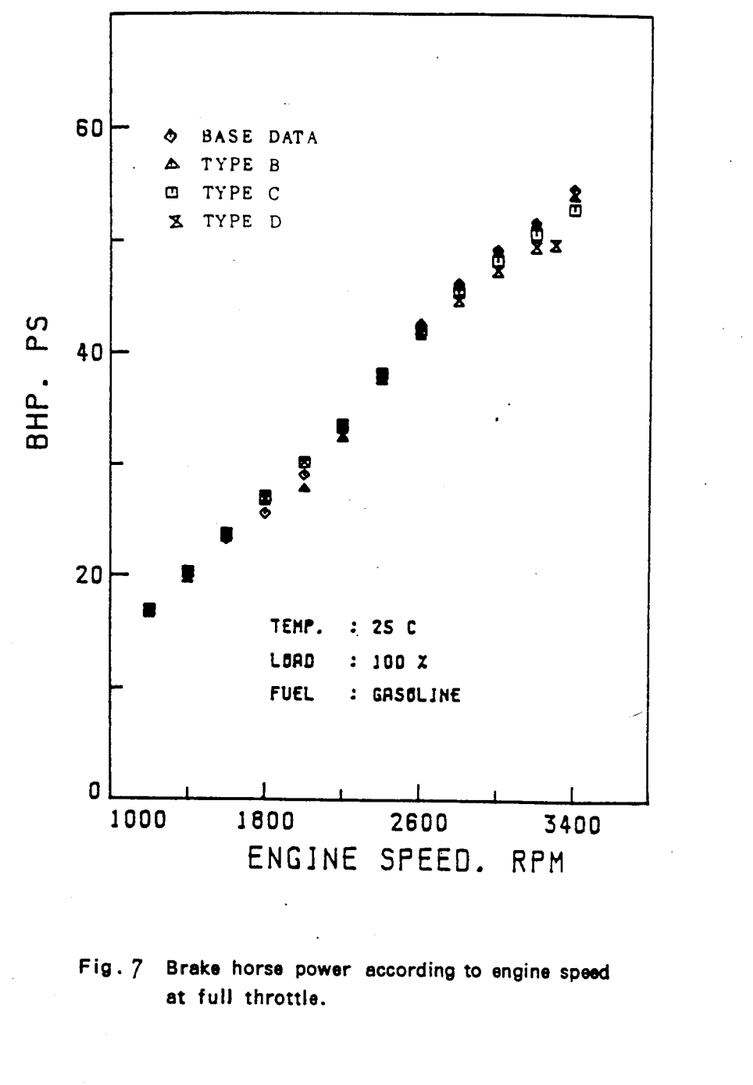

FIG. 7 illustrates the brake horse power according to engine speed at full throttle opening tested with B, C and D type swirl pots. Generally, all types of swirl pot denote similar to basic data except the D type of swirl pot, which is largest in size, shows decreasing tendency of output in the section of 3,000 rpm and up.

Figure 8:
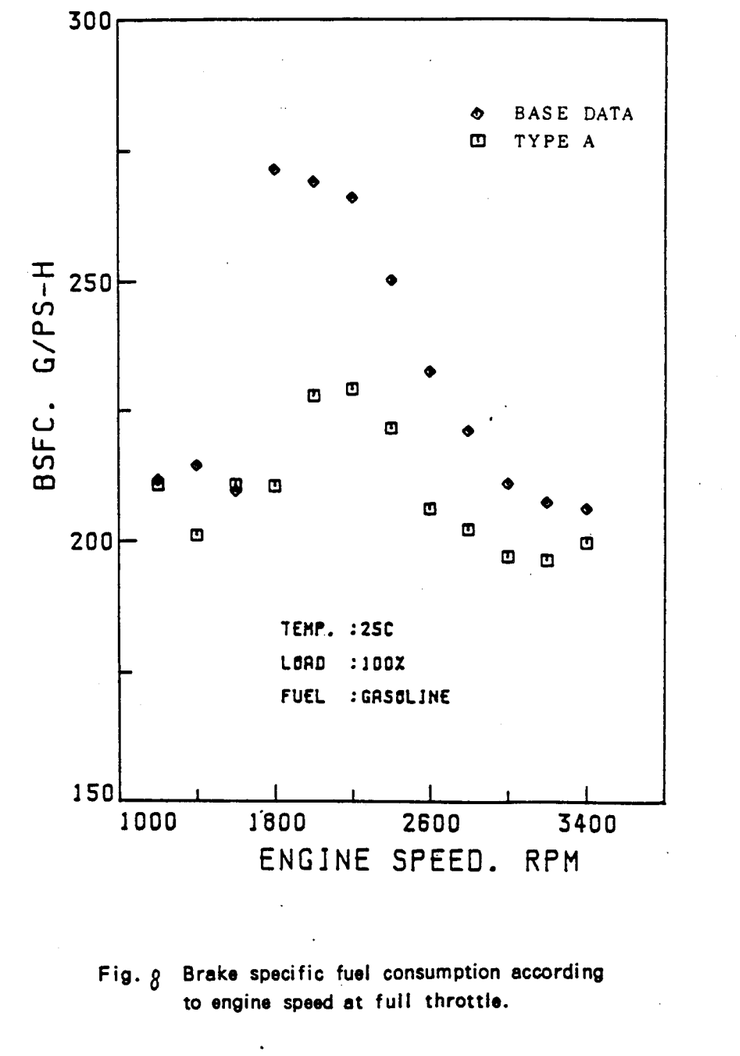

FIG. 8 illustrates the brake specific fuel consumption according to engine speed at full throttle opening compared with the A type (□) of swirl pot according to the present invention than basic type (◇) which is not fixed with any swirl pot. Generally, fuel consumption of a swirl pot of type A (□) is seen to be lower than basic type, that is to say, brake fuel consumption is decreased about 10% average in the section from 1,200 to 3,400 rpm than basic type, particularly brake fuel consumption of the present invention denotes about 210 G/PS-H despite basic type denote about 270 G/PS-H at 1,800 rpm of engine speed. This means that is the speed of 50–60 km/h may be usual running speed on the road, it brings the saving effect over 20% of fuel consumption.

Figure 9:
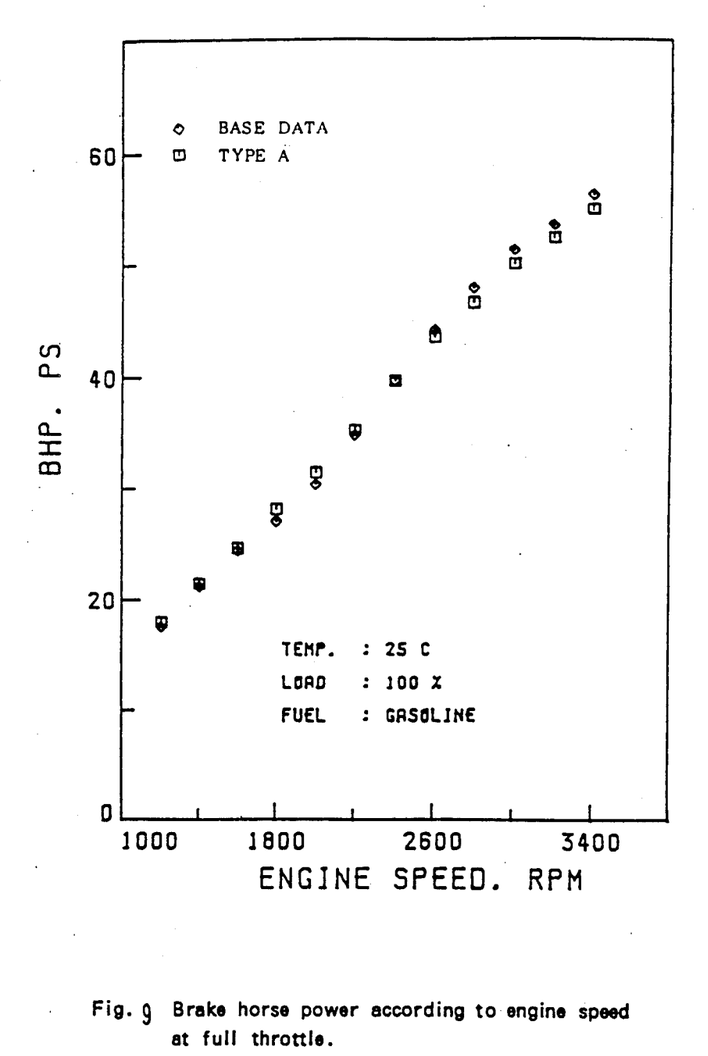

FIG. 9 illustrates the brake horsepower according to engine speed at full throttle opening for the A type of swirl pot according to the present invention compared with a basic type which is not fixed with any swirl pot. Both sets of the data are generally similar but horsepower when using an A type swirl pot is rather larger than the basic type at the range of 1,800 rpm to 2,400 of engine speed. Therefore, the present invention is most effective at 50–100 km/h of so called economic engine speed.

Figure 10:
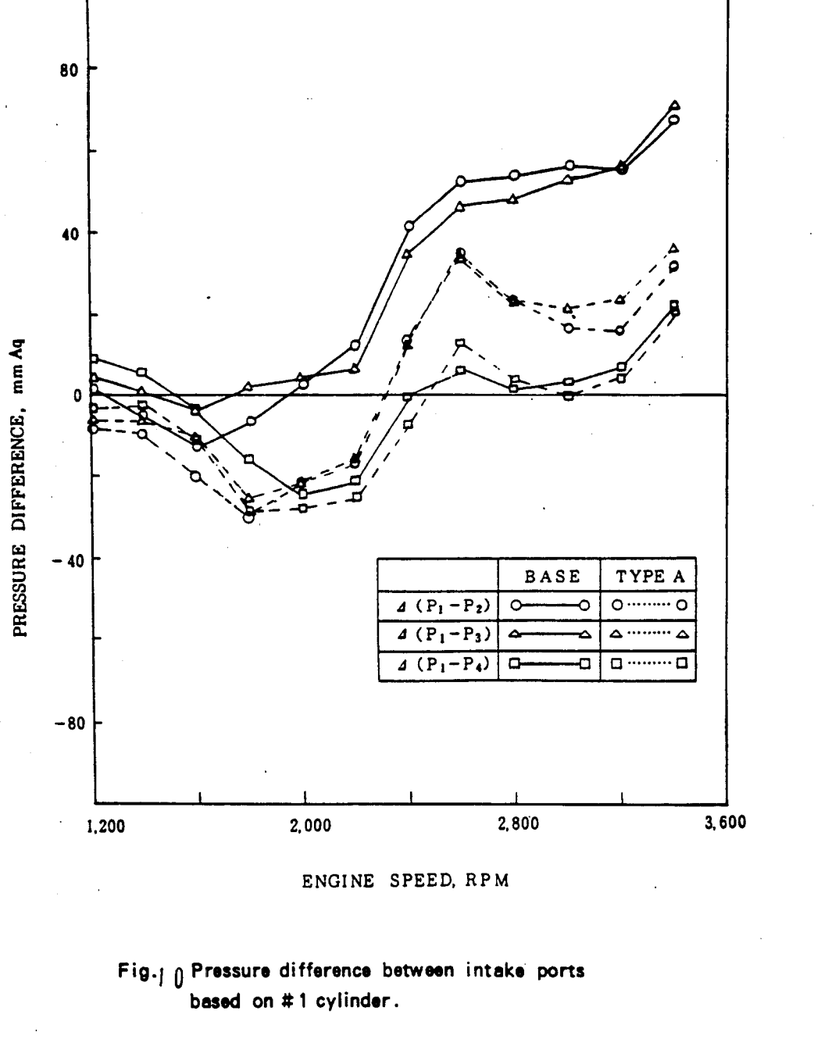
Figure 21:
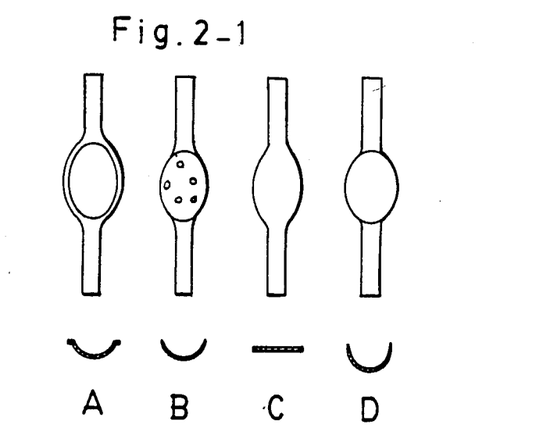

FIG. 10 illustrates the pressure difference between intake ports based on #1 cylinder in which the A type of swirl pot according to the present invention is compared with a basic type which is not fixed with any swirl pot.

Substantially, in a case when the pressure difference between mixture gas sucked into each individual intake port (4 ports for 4 cylinders) of intake manifold are similar to each other, not only does fuel consumption decrease but also the output of engine force increases. As in FIG. 10, the solid line denotes a pressure difference of an intake manifold of basic type, and the perforated line denotes pressure difference of intake manifold of A type according to the present invention.

It is seen from the graph that the solid line (base type) is rather getting wider from index number zero and distance between solid line each other is much apart, and perforated line (A type) is near the index number zero and distance between perforated line is closer.

These data mean that a pressure difference between intake ports based on #1 cylinder of solid line (basic type) is large and pressure difference of perforated line (A type according to the present invention) is almost even.

Therefore, present invention has the effect to make even the distribution of fuel gas sucking into each cylinder.

Conclusively, best mode for carrying out the present invention is to install the A type of swirl pot (4) in FIG. 2, thereby to decrease brake specific fuel consumption according to the present invention at the range of 1,200-3,400 rpm of engine speed, on 10% average, in comparison to the basic type which is not fixed with any swirl pot, and to brake specific fuel consumption according to the present invention by 10.4% on average in comparison to a basic type of a test mode cycle (for 20 minutes).

I claim:

1. In an intake system for an internal combustion engine, including a fuel-air mixing means (2) and an intake passageway (1) for intake of a fuel-air mixture generated thereby into a cylinder of the engine, the improvement comprising:
    concave pot means (4) for collecting and microvaporizing fuel-air mixture particles from the mixing means, and
    gas injecting means (5) for injecting additional gas into said fuel-air mixture, said gas injecting means (5) having one end adjacent a concave surface of the concave pot means and a second end (6) connected externally of the mixing means (2),
    said gas injecting means (5) comprising a pipe means having said second end (6) thereof adapted for housing a ball valve means (7), and
    further including filter means (10) at said second end (6) of said pipe means and spring means (8) for maintaining said ball valve means (7) in a closed condition.

2. An improved intake system for a gasoline engine as recited in claim 1 wherein said concave pot means (4) is installed between connecting flanges (3) of said intake passageway (1) and a carburetor (2).

3. An improved intake system for a gasoline engine according to claim 1, wherein said gas injecting pipe means (5) has a portion embedded within a supporting board (9) made of metal.

4. An improved intake system for a gasoline engine according to claim 1, wherein said concave pot means (4) for mixture particles is formed with a spoon shape.

5. An improved intake system for a gasoline engine according to claim 1, wherein said concave pot means (4) is installed near said intake passageway.

6. An improved intake system for an internal combustion engine as recited in claim 1, wherein said second end (6) of said gas injecting means (5) is located in an air environment thereby to inject additional air into said fuel-air mixture.

7. An improved intake system for an internal combustion engine as recited in claim 6, wherein said concave pot means (4) is formed of copper, said concave pot means (4) disposed in an intermediate passageway connecting the mixing means (2) and the intake passageway (1).

8. An improved intake system for an internal combustion engine as recited in claim 7, wherein said mixing means (2) comprises carburetor means.

9. An improved intake system for an internal combustion engine as recited in claim 1, wherein said gas injecting means (5) comprises a pipe means.

10. An improved intake system for an internal combustion engine as recited in claim 1, wherein said second end (6) of said gas injecting means (5) is located in an air environment thereby to inject additional air into said fuel-air mixture.

11. An improved intake system for an internal combustion engine as recited in claim 10, wherein said concave pot means (4) is formed of copper.

12. An improved intake system for an internal combustion engine as recited in claim 10, wherein said concave pot means (4) is disposed in an intermediate passageway connecting the mixing means (2) and the intake passageway (1).

13. An improved intake system for an internal combustion engine as recited in claim 12 wherein said mixing means (2) comprises carburetor means.

14. An improved intake system for an internal combustion engine as recited in claim 1 wherein said concave pot means (4) is structured for inducing swirling in the fuel-air mixture impinging thereon, thereby to enhance microvaporization of the fuel particles therein.

* * * * *